United States Patent
Fukami et al.

(10) Patent No.: US 11,244,266 B2
(45) Date of Patent: Feb. 8, 2022

(54) INCIDENT RESPONSE ASSISTING DEVICE

(71) Applicant: MITSUBISHI ELECTRIC CORPORATION, Tokyo (JP)

(72) Inventors: Kenta Fukami, Tokyo (JP); Hiroyuki Sakakibara, Tokyo (JP); Hiroki Nishikawa, Tokyo (JP); Aiko Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 207 days.

(21) Appl. No.: 16/017,362

(22) Filed: Jun. 25, 2018

(65) Prior Publication Data

US 2019/0197452 A1    Jun. 27, 2019

(30) Foreign Application Priority Data

Dec. 26, 2017  (JP) .............................. JP2017-248921

(51) Int. Cl.
    *G06Q 10/06* (2012.01)
(52) U.S. Cl.
    CPC .............................. *G06Q 10/06316* (2013.01)
(58) Field of Classification Search
    CPC ..... G06Q 10/06316; G06Q 10/063118; G06Q 10/0633; G06Q 10/20; G06N 20/00
    See application file for complete search history.

(56) References Cited

U.S. PATENT DOCUMENTS 7,925,527 B1 * 4/2011 Flam ...................... G06Q 10/00
                                                      705/7.26
8,266,072 B2 * 9/2012 Grace ................... G06Q 10/063
                                                      705/346

(Continued)

FOREIGN PATENT DOCUMENTS

JP    2006-146600 A    6/2006
JP    2007-207169 A    8/2007

(Continued)

OTHER PUBLICATIONS

Du, Min, et al. "Deeplog: Anomaly detection and diagnosis from system logs through deep learning." Proceedings of the 2017 ACM SIGSAC Conference on Computerand Communications Security. 2017. (Year: 2017).*

(Continued)

*Primary Examiner* — Matthew S Gart
*Assistant Examiner* — Hamzeh Obaid
(74) *Attorney, Agent, or Firm* — Buchanan Ingersoll & Rooney PC

(57) ABSTRACT

The incident response assisting device includes: an incident extraction unit, a response procedure creation unit, and a screen display unit. The incident extraction unit performs an incident extraction process on an alert indicating that an incident has occurred in a monitored object and on log data of the monitored object, to extract incident information. The response procedure creation unit creates an incident response procedure corresponding to the incident on the basis of the incident information and a response procedure template. The screen display unit selects a display range from the incident response procedure in accordance with a progress status of response and displays the display range as a display response procedure.

The incident extraction process is composed of a series of comparison processes in which a content of a comparison process to be subsequently performed is changed in accordance with a result of a previously performed comparison process.

10 Claims, 13 Drawing Sheets

(56) References Cited

U.S. PATENT DOCUMENTS

| | | | | |
|---|---|---|---|---|
| 9,027,121 | B2* | 5/2015 | Hammer | G06F 21/554 709/224 |
| 9,680,858 | B1* | 6/2017 | Boyer | G06Q 50/01 |
| 9,697,352 | B1* | 7/2017 | Armstrong | G06F 21/50 |
| 9,779,236 | B2* | 10/2017 | Abrams | G06F 21/55 |
| 10,181,032 | B1* | 1/2019 | Sadaghiani | G06N 3/08 |
| 10,341,377 | B1* | 7/2019 | Dell'Amico | H04L 63/1416 |
| 2002/0143595 | A1* | 10/2002 | Frank | G06Q 10/06 705/311 |
| 2008/0294384 | A1* | 11/2008 | Fok | H04M 1/72484 702/187 |
| 2010/0138382 | A1* | 6/2010 | Nagoya | H04L 63/1408 707/609 |
| 2015/0256554 | A1* | 9/2015 | Sakakibara | H04L 63/1425 726/25 |
| 2015/0350193 | A1* | 12/2015 | Honda | H04L 63/1416 726/8 |
| 2016/0078229 | A1* | 3/2016 | Gong | G06F 21/577 726/24 |
| 2016/0164909 | A1* | 6/2016 | Satish | H04L 63/1441 726/1 |
| 2017/0076239 | A1* | 3/2017 | Rahul U | G06Q 10/06398 |
| 2017/0169360 | A1* | 6/2017 | Veeramachaneni | H04L 63/1408 |
| 2017/0366582 | A1* | 12/2017 | Kothekar | H04L 63/101 |
| 2018/0307756 | A1* | 10/2018 | Garay | G06N 5/003 |
| 2018/0324207 | A1* | 11/2018 | Reybok, Jr | H04L 63/1416 |
| 2019/0068630 | A1* | 2/2019 | Valecha | H04L 63/1425 |
| 2019/0108470 | A1* | 4/2019 | Jain | G06Q 10/063118 |

FOREIGN PATENT DOCUMENTS

| | | |
|---|---|---|
| JP | 2010-224829 | 10/2010 |
| JP | 2011-076161 A | 4/2011 |
| JP | 2013-054531 A | 3/2013 |
| JP | 2015-121968 * | 7/2015 |
| KR | 101565942 B1 * | 11/2015 |

OTHER PUBLICATIONS

Office Action (Notice of Reasons for Refusal) dated Oct. 13, 2020, by the Japanese Patent Office in corresponding Japanese Patent Application No. 2017-248921 and English translation of the Office Action. (8 pages).

* cited by examiner

FIG. 3

| ALERT ID | DETECTION RESULT | RELATED LOG CORRESPONDING KEY | OPTION FIELD |
|---|---|---|---|
| 13 | THERE IS POSSIBILITY OF OCCURRENCE OF ABNORMALITY IN CONTROLLER ASSOCIATED WITH MALWARE INFECTION | 1234abcd | |

FIG. 4A

| FUNCTION NAME | TIME STAMP | ALERT ID | LEVEL | TRANSMISSION SOURCE IP | DESTINATION IP | OPTION FIELD |
|---|---|---|---|---|---|---|
| IDS | 2016-12-21 19:17:20 | 37 | High | 192.168.1.1 | 192.168.1.8 | |

FIG. 4B

| FUNCTION NAME | TIME STAMP | ALERT ID | LEVEL | HOST IP | PROCESS IP | OPTION FIELD |
|---|---|---|---|---|---|---|
| AV | 2016-12-23 11:43:03 | 25 | High | 192.168.1.2 | 3789 | Hash1 |

FIG. 4C

| FUNCTION NAME | TIME STAMP | EVENT ID | HOST IP | OPTION FIELD |
|---|---|---|---|---|
| EVENT LOG | 2016-12-23 19:17:20 | 2005 | 192.168.1.1 | |

FIG. 6

| PROCESS ID | COMPARISON EXPRESSION | REFERENCE EXPRESSION | JUMP DESTINATION |
|---|---|---|---|
| 1 | And(==$src_ip,$PCA_ip), (>$timestamp,$alert.timestamp) | SQL STATEMENT A | 2,3 |
| 2 | ==,$dst_ip,$PCB | SQL STATEMENT B | 4,5 |
| ... | ... | ... | ... |
| ... | ... | ... | ... |

FIG. 8

| PROCESS ID | COMPARISON EXPRESSION | REFERENCE EXPRESSION | JUMP DESTINATION |
|---|---|---|---|
| 1 | Count=0<br>for x in loglist:<br>  if x.src_ip==PCA.ip<br>   Count=Count+1<br>if Count<10:<br>  return A<br>elif Count 20:<br>  return B<br>else:<br>  return C | SQL STATEMENT A | A:2<br>B:3<br>C:End |
| 2 | for x in loglist:<br>  if x.dst_ip==PCB.ip<br>   return True<br>  return False | SQL STATEMENT B | True:4<br>False:5 |
| ... | ... | ... | ... |
| ... | ... | ... | ... |

FIG. 11

| PROCESS ID | COMPARISON EXPRESSION | REFERENCE EXPRESSION | JUMP DESTINATION |
|---|---|---|---|
| 1 | And(==$src_ip,$PCA_ip), (>$timestamp,$alert.timestamp) | SQL STATEMENT A | 2,3 NO LOG : A_1 |
| 2 | ==,$dst_ip,$PCB | SQL STATEMENT B | A_2,4 |
| ... | ... | ... | ... |
| ... | ... | ... | ... |

FIG. 12

| INSTRUCTION ID | DISPLAY | ACTION | JUMP DESTINATION |
|---|---|---|---|
| A_1 | PLEASE ADD LOGS OF DEVICE A HAVING DATE AND TIME WITHIN 1 HOUR BEFORE AND AFTER yyyy:mm:dd:hh:mm:ss | LOGS OF DEVICE A WITHIN 1-HOUR RANGE BEFORE AND AFTER yyyy:mm:dd:hh:mm:ss ARE ADDED | 5,END |
| A_2 | ... | ... | ... |
| ... | ... | ... | ... |
| ... | ... | ... | ... |

INCIDENT RESPONSE ASSISTING DEVICE

BACKGROUND OF THE INVENTION

1. Field of the Invention

The present invention relates to an incident response assisting device that assists a user in performing response work when a security incident (hereinafter, incident) has occurred.

2. Description of the Background Art

The main work performed when an incident has occurred includes detection and response. Said work requires both knowledge about security and knowledge about a device or system in which the incident has occurred. To rapidly and accurately conduct the work, high cost for sufficient personnel arrangement, education of users, and the like has been required. In addition, when an incident has occurred in a large-scale system, it takes a lot of time to identify the type and the occurrence location of the incident that has occurred, which further increases the cost for incident response. For this reason, an operation management system has been proposed in which a reception management system manages an incident state for each incident, a knowledge system manages a response procedure for each error code, and an integration support system causes a remote operation system to perform remote maintenance operation on a monitored server on the basis of the incident state and the response procedure (see, for example, Patent Document 1).

Patent Document 1: Japanese Laid-Open Patent Publication No. 2010-224829

However, the operation management system of Patent Document 1 is configured such that, when a response procedure corresponding to an error code for an incident that has occurred has not been registered in the knowledge system, a manual response process is performed. In addition, Patent Document 1 does not disclose what instruction and assistance are made to a user when performing the manual response process. Thus, regarding the operation management system of Patent Document 1, the range wherein the operation management system can respond is limited to incidents for which response procedures have been registered, and there is a problem in that the operation management system cannot respond flexibly to various incidents.

SUMMARY OF THE INVENTION

The present invention has been made to solve the above-described problem, and provides an incident response assisting device that can respond flexibly to various incidents.

An incident response assisting device according to the present invention includes: an incident detection information acquisition unit for acquiring incident detection information indicating that an incident has occurred in a monitored object; a log data acquisition unit for acquiring log data of the monitored object; an incident extraction unit for performing an incident extraction process on the incident detection information and the log data to extract incident information that identifies the incident that has occurred in the monitored object; a response procedure creation unit for creating an incident response procedure corresponding to the incident that has occurred in the monitored object, on the basis of the incident information and a response procedure template created in advance; and a display unit for displaying the incident response procedure created by the response procedure creation unit. The incident extraction process is composed of a series of comparison processes in which a content of a comparison process to be subsequently performed is changed in accordance with a result of a previously performed comparison process.

According to the present invention, since the incident response procedure is created on the basis of the incident information that identifies the incident that has occurred in the monitored object, it is possible to respond flexibly to various incidents.

BRIEF DESCRIPTION OF THE DRAWINGS

FIG. 3 is a diagram showing an example of an alert according to Embodiment 1 of the present invention;

FIG. 4A is a diagram showing an example of log data according to Embodiment 1 of the present invention and illustrates an example of a log of an IDS;

FIG. 4B is a diagram showing an example of the log data according to Embodiment 1 of the present invention and illustrates an example of a log of anti-virus software;

FIG. 4C is a diagram showing an example of the log data according to Embodiment 1 of the present invention and illustrates an example of an event log;

FIG. 6 is a diagram showing an example of an incident extraction process according to Embodiment 1 of the present invention;

FIG. 8 is a diagram showing an example of an incident extraction process according to Embodiment 2 of the present invention;

FIG. 11 is a diagram showing an example of an incident extraction process according to Embodiment 3 of the present invention; and FIG. 12 is a diagram showing an example of an action instruction table according to Embodiment 3 of the present invention.

DETAILED DESCRIPTION OF THE PREFERRED EMBODIMENTS OF THE INVENTION

Embodiment 1

Figure 1A:
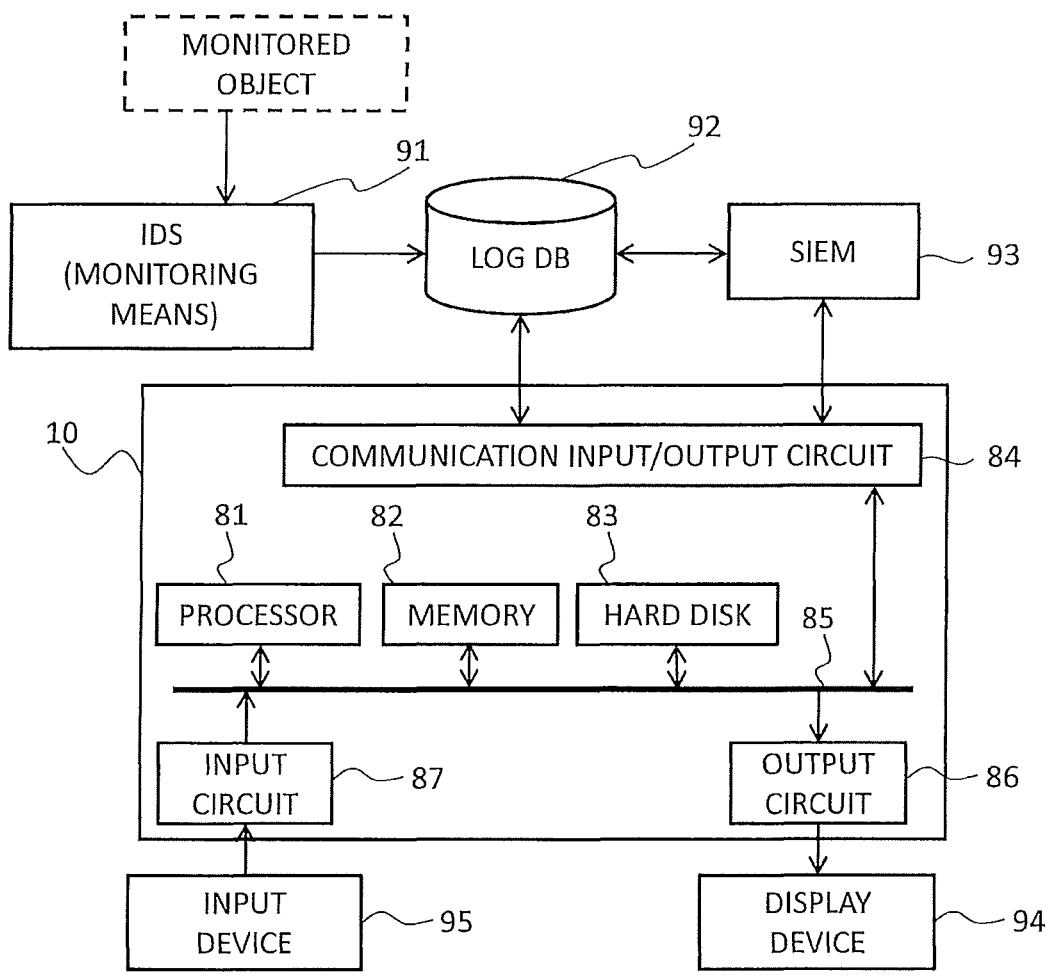
FIG. 1A is a hardware configuration diagram showing an incident response assisting device according to Embodiment 1 of the present invention in the case where SIEM is present outside the device.
Figure 1B:
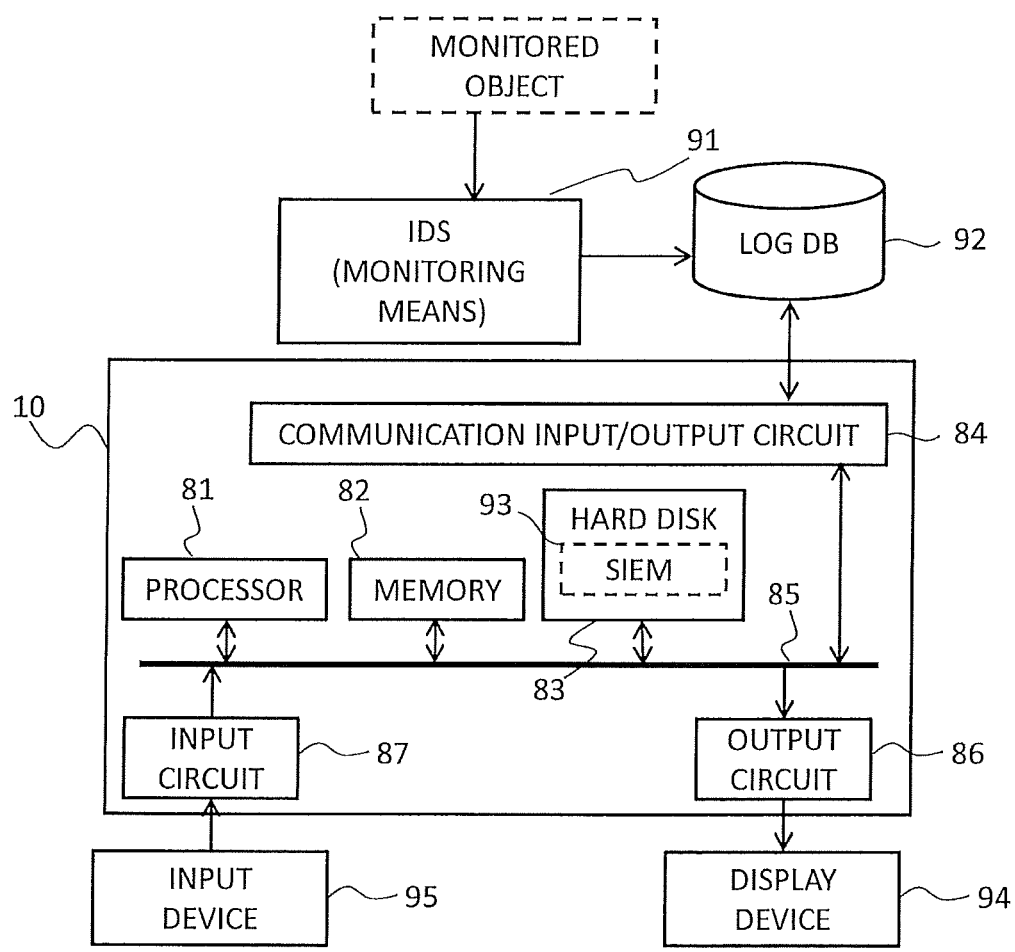
FIG. 1B is a hardware configuration diagram showing the incident response assisting device according to Embodiment 1 of the present invention in the case where the SIEM is present inside the device.

Hereinafter, Embodiment 1 of the present invention will be described with reference to FIGS. 1 to 7. FIG. 1A is a hardware configuration diagram showing an incident response assisting device according to Embodiment 1 in the case where SIEM (Security Information and Event Management) is present outside the device. FIG. 1B is a hardware configuration diagram in the case where the SIEM is present inside the device. The incident response assisting device 10 is configured such that a processor 81, a memory 82, and a hard disk 83 that is an auxiliary storage device, are connected to each other by a system bus 85 as shown in FIGS. 1A and 1B. Further connected to the system bus 85 are a communication input/output circuit 84 that performs communication with an external device via a network, an output circuit 86 that performs output to an external device such as a display device 94 that is, for example, a liquid crystal display, and an input circuit 87 that receives an input from an input device 95 that is, for example, a keyboard, a mouse, a touch panel, or the like. The communication input/output circuit 84 is connected to a log DB 92 that stores a log outputted by an IDS (Intrusion Detection System) 91. The log DB 92 is set such that the log DB 92 can be referred to from the incident response assisting device 10. In Embodiment 1, the log DB 92 is provided outside the incident response assisting device 10. However, the log DB 92 may be configured by using the hard disk 83.

The IDS 91 is a network type IDS that is provided as a monitoring means on a network to which a device or system that is a monitored object is connected. The IDS 91 transmits a log for a packet having a transmission source or a transmission destination that is the monitored device or system, to the log DB 92. In Embodiment 1, as an example, the monitoring means is the IDS 91, and a device on the network to which the IDS 91 is connected is set as the monitored object. The monitoring means may be one having a function to collect logs for the monitored device or system, such as a server, a router, or an IPS (Intrusion Prevention System) having a firewall function, anti-virus software (AV) installed in the monitored device or in a device connected to the monitored object via the network, and an OS (Operating System) capable of collecting event logs.

The contents of logs stored in the log DB 92 are checked by SIEM 93, that is, an incident detection device. The SIEM 93 may be connected as an external device to the incident response assisting device 10 so as to be able to perform communication therewith by the communication input/output circuit 84 as shown in FIG. 1A, or may be software that runs in the incident response assisting device 10 as shown in FIG. 1B. In accordance with a predefined rule, the SIEM 93 outputs an alert, that is, incident detection information, to the incident response assisting device 10 when the SIEM 93 determines that an incident has occurred, from the contents of the logs stored in the log DB 92, for example, when the SIEM 93 detects presence of an illegal packet in a log of the IDS 91. As described above, the SIEM 93 monitors the monitored device or system via the monitoring means such as the IDS 91, and detects occurrence of an incident.

Figure 2:
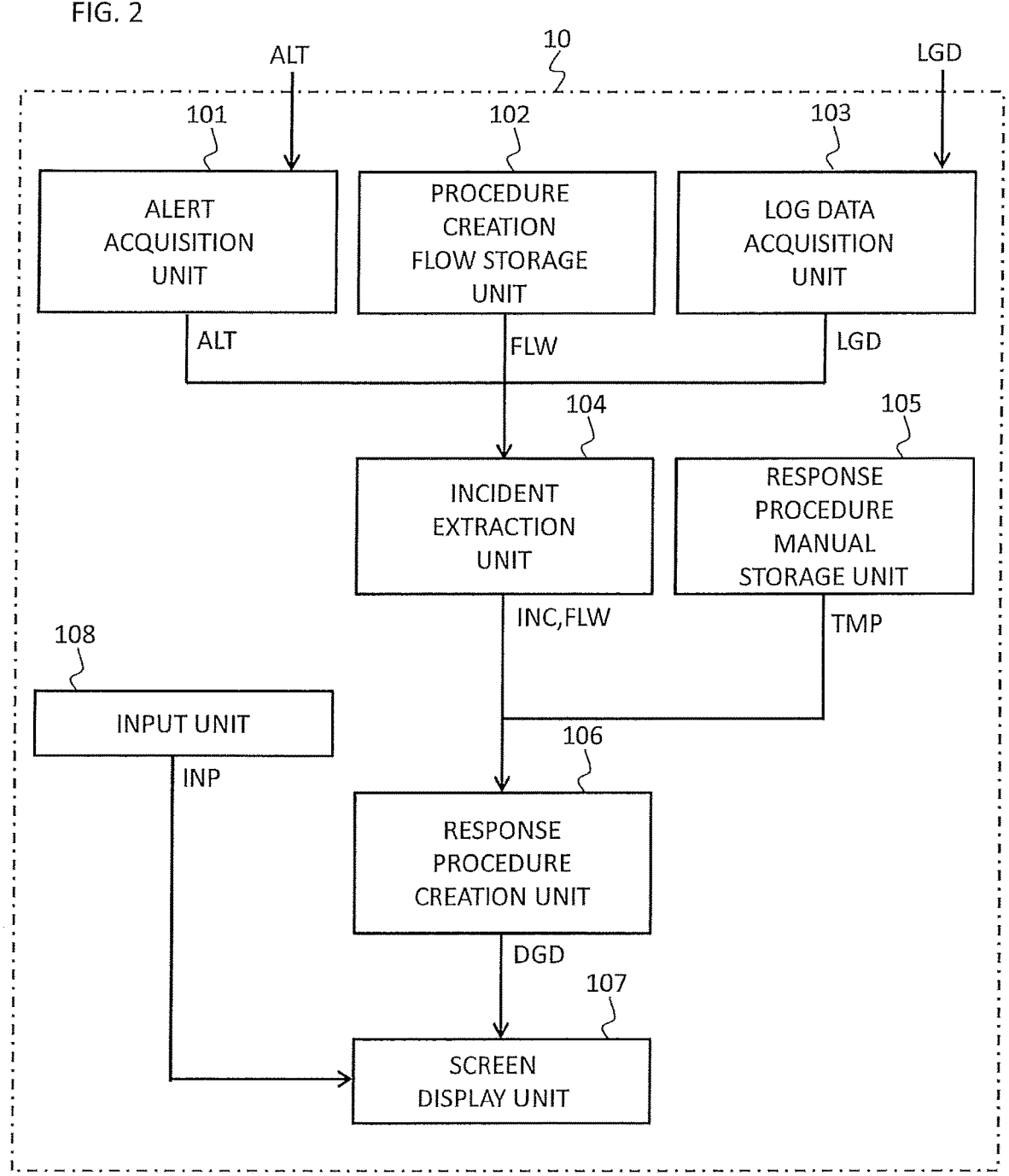
FIG. 2 is a functional block diagram showing the incident response assisting device according to Embodiment 1 of the present invention.

Next, the function of the incident response assisting device 10 will be described. FIG. 2 is a functional block diagram showing the incident response assisting device according to Embodiment 1. As shown in FIG. 2, the incident response assisting device 10 includes: an alert acquisition unit 101, that is, an incident detection information acquisition unit, that acquires an alert ALT from the SIEM 93; a procedure creation flow storage unit 102 that stores a procedure creation flow FLW for creating a display response procedure DGD to be presented to a user; a log data acquisition unit 103 that acquires log data LGD of the monitored device or system; an incident extraction unit 104 that extracts incident information INC from the alert ALT and the log data LGD in accordance with the procedure creation flow FLW to extract an incident detected by the SIEM 93; a response procedure manual storage unit 105 in which a response procedure template TMP for responding to various incidents is stored; a response procedure creation unit 106 that creates the display response procedure DGD to be displayed to the user, by combining the incident information INC and the response procedure template TMP; a screen display unit 107, that is, a display unit, that displays the display response procedure DGD; and an input unit 108 that transmits progress information of incident response inputted from the user, as an input INP, to the screen display unit 107. These function units are realized by the processor 81 executing a program stored in the memory 82 or the hard disk 83. In addition, a plurality of processors 81 and a plurality of memories 82 or hard disks 83 may cooperate to realize the above function units. A more specific description will be given below.

The alert acquisition unit 101 is realized by the processor 81, the communication input/output circuit 84, and the memory 82 or the hard disk 83. In the case where the SIEM 93 is present outside, in response to a request from the processor 81, the alert acquisition unit 101 receives the alert ALT from the SIEM 93 by the communication input/output circuit 84 and then stores the received alert ALT in the memory 82 or the hard disk 83. In the case where the SIEM 93 is present inside, the alert acquisition unit 101 stores the alert ALT in the memory 82 or the hard disk 83 in response to a request from the processor 81. The alert ALT stored in the memory 82 or the hard disk 83 is read by the incident extraction unit 104 at timing determined in the procedure creation flow FLW. The alert ALT is outputted from the SIEM 93 when an incident has occurred. However, the alert acquisition unit 101 may confirm presence/absence of the alert ALT in the SIEM 93 at predetermined timing.

The procedure creation flow storage unit 102 is realized by the memory 82 or the hard disk 83 and stores one or more procedure creation flows FLW created in advance. Each procedure creation flow FLW includes flow of a series of processes from an incident extraction process of extracting the incident information INC to creation of the display response procedure DGD. Each procedure creation flow FLW may be automatically or manually created, and may be created by the incident response assisting device 10 or another device. In addition, the function of the procedure creation flow storage unit 102 may be realized by a storage device external to the incident response assisting device 10, such as an external hard disk or an external database. Moreover, for example, each procedure creation flow FLW may be stored so as to be associated with each type of alert ALT.

The log data acquisition unit 103 is realized by the processor 81, the communication input/output circuit 84, and the memory 82. In response to a request from the processor 81, the log data acquisition unit 103 receives log data LGD required by the incident extraction unit 104, from the log DB 92, and stores the received log data LGD in the memory 82. The log data LGD stored in the memory 82 is read by the incident extraction unit 104 at timing determined in the procedure creation flow FLW. Information included in the log data LGD includes, for example, an account name with which and a time at which log-in to the monitored device or system is performed and log-in success/failure information, and depends on the monitored device or system.

The incident extraction unit 104 is realized by the processor 81 and the memory 82. The incident extraction unit 104 reads the alert ALT and the procedure creation flow FLW corresponding to the alert ALT from the memory 82, reads required log data LGD from the memory 82 as appropriate while performing the process in the procedure creation flow FLW by the processor 81, extracts incident information INC of an incident to be responded to from the alert ALT and the log data LGD, and stores the extracted incident information INC in the memory 82. The incident information INC is information that identifies the incident that has occurred, such as the type, the occurrence time, and the occurrence location of the incident.

The response procedure manual storage unit 105 is realized by the memory 82 or the hard disk 83 and stores one or more response procedure templates TMP created in advance. Each response procedure template TMP includes abstract general incident response procedures for various incidents, such as stop and restart of a device, disconnection and re-connection from and to the network, and state confirmation. Each response procedure template TMP may be automatically or manually created, and may be created by the incident response assisting device 10 or another device. In addition, the function of the response procedure manual storage unit 105 may be realized by a storage device external to the incident response assisting device 10, such as an external hard disk or an external database. Moreover, for example, each response procedure template TMP may be stored so as to be associated with each type of alert ALT.

The response procedure creation unit 106 is realized by the processor 81 and the memory 82. The response procedure creation unit 106 reads the procedure creation flow FLW, the incident information INC, and the response procedure template TMP from the memory 82 and creates an incident response procedure corresponding to an incident that has occurred in the monitored object, by combining the incident information INC and the response procedure template TMP in accordance with the procedure creation flow FLW. Furthermore, the response procedure creation unit 106 creates a display response procedure DGD by selecting a range to be displayed to the user, of the created incident response procedure, and stores the display response procedure DGD in the memory 82. In Embodiment 1, selection of a display range corresponding to a progress status of incident response is performed such that the display response procedure DGD reflects the progress status of incident response. Data about the progress status of incident response is acquired through an input from the user.

The screen display unit 107 is realized by the output circuit 86 and the display device 94. The screen display unit 107 reads the display response procedure DGD stored in the memory 82 and outputs the display response procedure DGD via the output circuit 86 to the display device 94 to display the display response procedure DGD in a predetermined layout on the display device 94. The input unit 108 is realized by the input circuit 87 and the input device 95.

Next, the alert ALT and the log data LGD will be described. FIG. 3 is a diagram showing an example of the alert according to Embodiment 1, and FIGS. 4A, 4B, and 4C are each a diagram showing an example of the log data. As shown in FIG. 3, the alert ALT includes an alert ID that identifies the alert, a detection result, a related log corresponding key indicating a related log, and an option field as extension information. To the option field, data is inputted depending on the type of incident. For example, when the incident is infection with a virus, the hash value of the virus causing the infection, or the like is inputted to the option field. The input to the option field is used, for example, in acquiring the log data LGD, and is not particularly limited as long as the input can be used in an SQL statement for searching for the log data LGD.

FIG. 4A is a diagram showing an example of the log data according to Embodiment 1 and illustrates an example of a log of the IDS. In the log outputted by the IDS, a "function name" indicating a monitoring means is the IDS, and the log includes a time stamp indicating the date and time at which an illegal packet is detected, an alert ID indicating the type of a corresponding alert ALT, a threat level, information about the detected illegal packet such as the transmission source IP and the transmission destination IP of the illegal packet, and an option field as extension information.

FIG. 4B is a diagram showing an example of a log of anti-virus software. In the log outputted by the anti-virus software, a "function name" indicating a monitoring means is AV, and the log includes a time stamp indicating the date and time at which sign of a virus is detected, an alert ID indicating the type of a corresponding alert ALT, a threat level, and information about the detected sign of the virus such as a host IP indicating the IP of a device in which the sign of the virus is detected, and a process ID. In addition, a hash value indicating the virus causing the sign, or the like is inputted to an option field as extension information. The input to the option field may be a signature or the like.

FIG. 4C is a diagram showing an example of an event log. In the case of an event log outputted by the OS, a "function name" is the event log, and information that identifies an event, such as a time stamp indicating the time at which the event occurs, an event ID, and a host IP indicating the IP of a device in which the event occurs, is included. Examples of the event include an USB insertion event and log-in/log-off.

Figure 5:
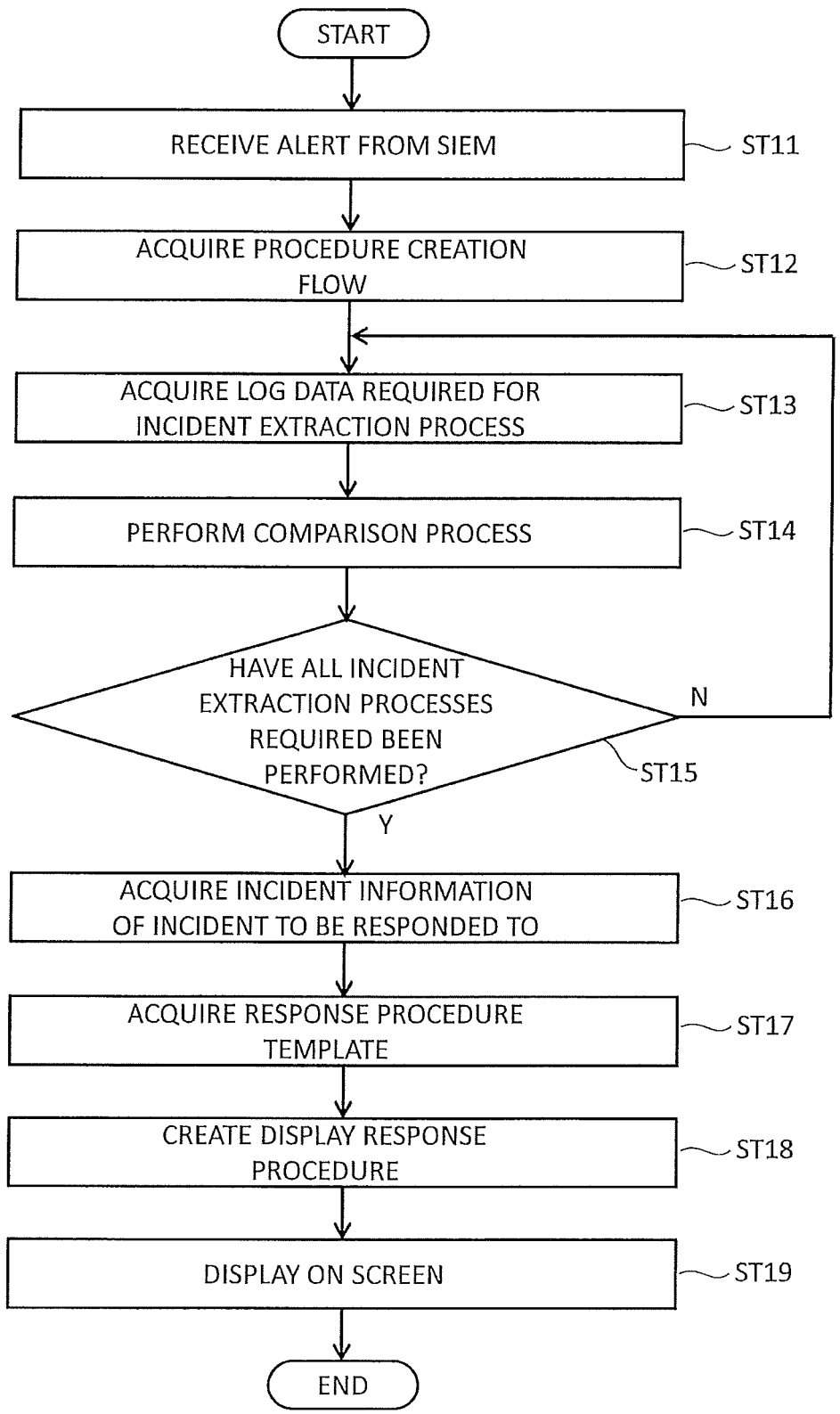
FIG. 5 is a flowchart showing operation of the incident response assisting device according to Embodiment 1 of the present invention.
Figure 7:
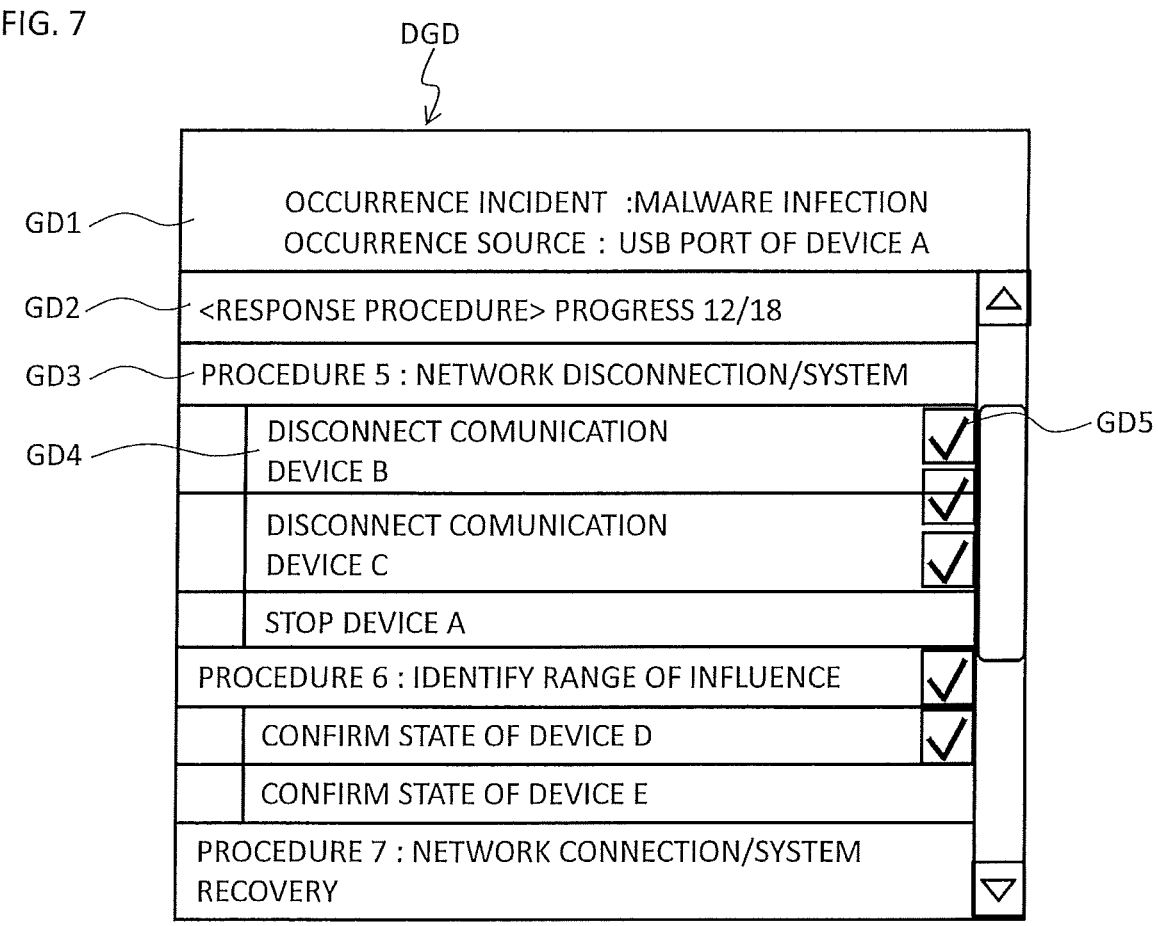
FIG. 7 is a diagram showing an example of a display response procedure according to Embodiment 1 of the present invention.

Next, operation will be described. FIG. 5 is a flowchart showing operation of the incident response assisting device according to Embodiment 1, FIG. 6 is a diagram showing an example of the incident extraction process according to Embodiment 1, and FIG. 7 is a diagram showing an example of the display response procedure according to Embodiment 1.

First, the alert acquisition unit 101 receives one or more alerts ALT from the SIEM 93 (step ST11). The alert acquisition unit 101 stores the received alerts ALT in the memory 82.

After the reception of the alerts ALT, the procedure creation flow storage unit 102 writes a procedure creation flow FLW into the memory 82, and the incident extraction unit 104 acquires the procedure creation flow FLW written into the memory 82 (step ST12). Next, the incident extraction unit 104 reads an incident extraction process in the procedure creation flow FLW and sequentially performs a series of processes therein. As shown in the example in FIG. 6, the incident extraction process includes four elements, a "process ID" uniquely associated with each process, a "comparison expression" indicating the contents of a comparison process that is a comparison of variables, a "reference expression" indicating an SQL statement for acquiring required log data LGD, and a "jump destination" indicating the process ID of a process to be performed subsequently, in accordance with a result of the comparison process, and is composed of a series of comparison processes in which the contents of a comparison process to be performed subsequently are changed in accordance with a result of a previously performed comparison process. Each SQL statement is described such that all log data LGD required for executing comparison expressions having the same process ID are acquired. In the case of the example shown in FIG. 5, the incident extraction unit 104 initially outputs an instruction to the log data acquisition unit 103 by executing the SQL statement A, thereby causing the log data acquisition unit 103 to acquire all log data LGD required for the comparison expression of a process ID 1 (step ST13). The log data acquisition unit 103 writes the acquired log data LGD into the memory 82.

Next, the incident extraction unit 104 performs the comparison process described in the comparison expression of the process ID 1 (step ST14). The comparison process is performed with the information of the alert ALT and the log data LGD as an object to be compared. After the incident extraction process with a certain process ID is performed, the incident extraction unit 104 checks whether all incident extraction processes required for creating incident information INC have been performed (step ST15). Here, whether all the incident extraction processes required have been performed is determined on the basis of the value of the jump destination. That is, when another process ID is indicated as the jump destination, the incident extraction unit 104 determines that not all the incident extraction processes required have been performed, and performs steps ST13 to ST15 at the process ID that is the jump destination. When there is no jump destination (End), the incident extraction unit 104 determines that all the incident extraction processes required have been performed, and proceeds to step ST16. By performing each incident extraction process as described above, incident information INC of an incident that has occurred is created. The comparison expression may be described in any form as long as the comparison expression can be executed by the incident extraction unit 104. For example, the comparison expression may be described by Polish notation. In addition, the comparison expression may include a constant and a log to be referred to. Regarding the variables in the comparison expression, entity is not inputted in the initial state, and thus entity is inputted to the variables when the comparison process is actually performed.

When a possibility of brute force attack is considered as an example of the incident, log data LGD of an event log of a device having a host IP that is the same as the destination IP of the log of the IDS 91 is acquired, and the comparison process is performed for log-in success/failure information within a predetermined period in the device, thereby determining presence/absence of occurrence of brute force attack and identifying the occurrence location of the brute force attack, and the like. In addition, when a possibility of infection with a virus is considered as an example of the incident, log data LGD of a log including a hash value in the option field of the alert ALT is acquired, and all devices that may be infected with the virus and the detailed source of the virus are identified from the acquired log data LGD. The incident information INC includes the information of the alert ALT used in each comparison process, the information of the log data LGD, and the contents and the results of the comparison processes.

After the incident extraction unit 104 performs all the incident extraction processes required for creating the incident information INC, the incident extraction unit 104 acquires the incident information INC from the results of the incident extraction processes (step ST16) and writes the acquired incident information INC into the memory 82. When the incident to be responded to cannot be extracted, for example, when the alert ALT from the SIEM 93 is due to false detection, the incident extraction unit 104 writes information indicating that there is no incident to be responded to, into the memory 82.

When the incident information INC is written into the memory 82, the response procedure template TMP is also written into the memory 82 by the response procedure manual storage unit 105. The response procedure creation unit 106 acquires the incident information INC and the response procedure template TMP (step ST17), creates an incident response procedure corresponding to the incident that has occurred in the monitored object on the basis of the incident information INC and the response procedure template TMP in accordance with the procedure creation flow FLW, and also creates a display response procedure DGD by selecting a portion to be displayed, from the created incident response procedure (step ST18). The response procedure creation unit 106 passes the display response procedure DGD to the screen display unit 107. When the incident to be responded to has not been extracted, the response procedure creation unit 106 passes information indicating that there is no incident to be responded to, to the screen display unit 107.

The screen display unit 107 displays the display response procedure DGD on the screen of the display device 94 (step ST19). As shown in FIG. 7, the display response procedure DGD includes an incident information display unit GD1 displaying the type and the occurrence location of the incident that has occurred, a progress display unit GD2 displaying the present progress status of incident response, response procedure display units GD3 each displaying a broad outline of the response procedure, and detailed procedure display units GD4 each displaying a more detailed response procedure such as a procedure for an individual device. In addition, each detailed procedure display unit GD4 is provided with a completion checkbox GD5 indicating completion/incompletion of a corresponding detailed procedure, and clearly shows a specific response status to the user. The reason why the response procedure being displayed is selected as a display response procedure, etc., may be displayed. When the incident to be responded to has not been extracted, wording or explanation indicating that there is no incident to be responded to is displayed.

In Embodiment 1, the progress status of incident response is acquired through an input from the user and reflected in the completion checkbox GD5. However, the progress status may be grasped at the incident response assisting device 10 side, and an input to the completion checkbox GD5 may be limited in accordance with the progress status. In this case, the completion checkbox GD5 for which the corresponding detailed procedure has not been completed is limited such that the completion checkbox GD5 cannot be checked by the user. Regarding the grasping of the progress status, for example, information such as a start state of each device and a network connection state is acquired on the basis of the log from the SIEM 93, and completion/incompletion of the corresponding detailed procedure is determined. In addition, in Embodiment 1, the progress status is grasped through the completion checkbox GD5. However, this is an example, and a method other than a checkbox may be used as long as the progress of response can be confirmed, for example, the color of the detailed procedure display unit GD4 may be changed in accordance with completion/incompletion.

According to Embodiment 1, the contents of an incident that has occurred in the monitored device or system can be easily grasped, and it is also possible to respond flexibly to various incidents. More specifically, an alert indicating that an incident has occurred in the monitored object, and log data of the monitored object are acquired, and incident information that identifies the incident is extracted from the alert and the log data. The incident extraction process for extracting the incident information is composed of the series of comparison processes, and the process contents are changed in accordance with a previously performed comparison process. Accordingly, what comparison processes are performed and what results are obtained as a whole depend on the contents of an incident having actually occurred, and thus finally acquired incident information and an incident response procedure based on the incident information correspond to the contents of the incident having actually occurred. Therefore, the contents of an incident that has occurred in the monitored device or system can easily be grasped, and it is also possible to respond flexibly to various incidents. In addition, the user is allowed to easily grasp the relationship between the contents of an incident that has occurred in the monitored object and response work, and required response work, and the load of incident response work can be reduced.

Since the display response procedure, a display range of which is selected in accordance with the progress status of incident response, is displayed, it is easy to find work that should be performed presently, from among the response procedures, so that the load of incident response work is further reduced and also the user is allowed to rapidly perform the response work.

In Embodiment 1, the display response procedure DGD is displayed on the display device 94 from the output circuit 86. However, the display response procedure DGD may be transmitted via a network. In this case, data of the display response procedure DGD is transmitted to a client terminal such as a personal computer or a tablet on which a dedicated application runs, and the display response procedure DGD is displayed at the client terminal side. With such a configuration, even when the monitored object and the incident response assisting device 10 are away from each other, it is possible to timely assist the user at the site in responding to an incident, and thus it is possible to more rapidly respond to an incident.

Embodiment 2

Hereinafter, Embodiment 2 of the present invention will be described with reference to FIG. 8. FIG. 8 is a diagram showing an example of an incident extraction process according to Embodiment 2. Embodiment 2 is different from Embodiment 1 in that a series of process expressions described as a script are performed in the incident extraction process. The difference between Embodiment 1 and Embodiment 2 is only the incident extraction process. Thus, the incident extraction process will be described below.

First, similar to Embodiment 1, log data LGD required by an SQL statement indicated in the reference expression is acquired. Next, the incident extraction unit 104 stores the acquired log data LGD in each row of loglist variables that are list type variables. After all the log data LGD is stored in the loglist variables, a return value is obtained by performing a comparison process described in the process expression on the basis of the log data LGD stored in the loglist variables and the information included in the alert ALT. Then, a similar process is performed at a process ID that is the jump destination corresponding to the return value. The series of processes are repeated until no jump destination is left, similar to Embodiment 1.

The process expression is described in a language that allows the incident extraction unit 104 to execute the process expression, for example, in script language such as python and ruby. For example, the process expression has a plurality of comparison expressions, a return value in each process expression corresponds to a result of a comparison process in the process expression, such as the number of times in which the result of the comparison process is True, and the return value is not limited to a binary value like the result of the comparison expression in Embodiment 1. Thus, it is possible to perform a more detailed incident extraction process such as changing a process in accordance with the number of logs that conform to a condition.

The others are the same as in Embodiment 1, and the description thereof is omitted.

According to Embodiment 2, the same advantageous effects as those in Embodiment 1 can be obtained.

Since it is possible to perform a more detailed incident extraction process by performing the process expression described in script language in the incident extraction process, information of an incident that has occurred in the monitored object can be grasped in more detail, and a more detailed and appropriate incident response procedure can be created. Thus, it is possible to respond to a complicated incident, and the load of incident response work can be further reduced.

Embodiment 3

Figure 9:
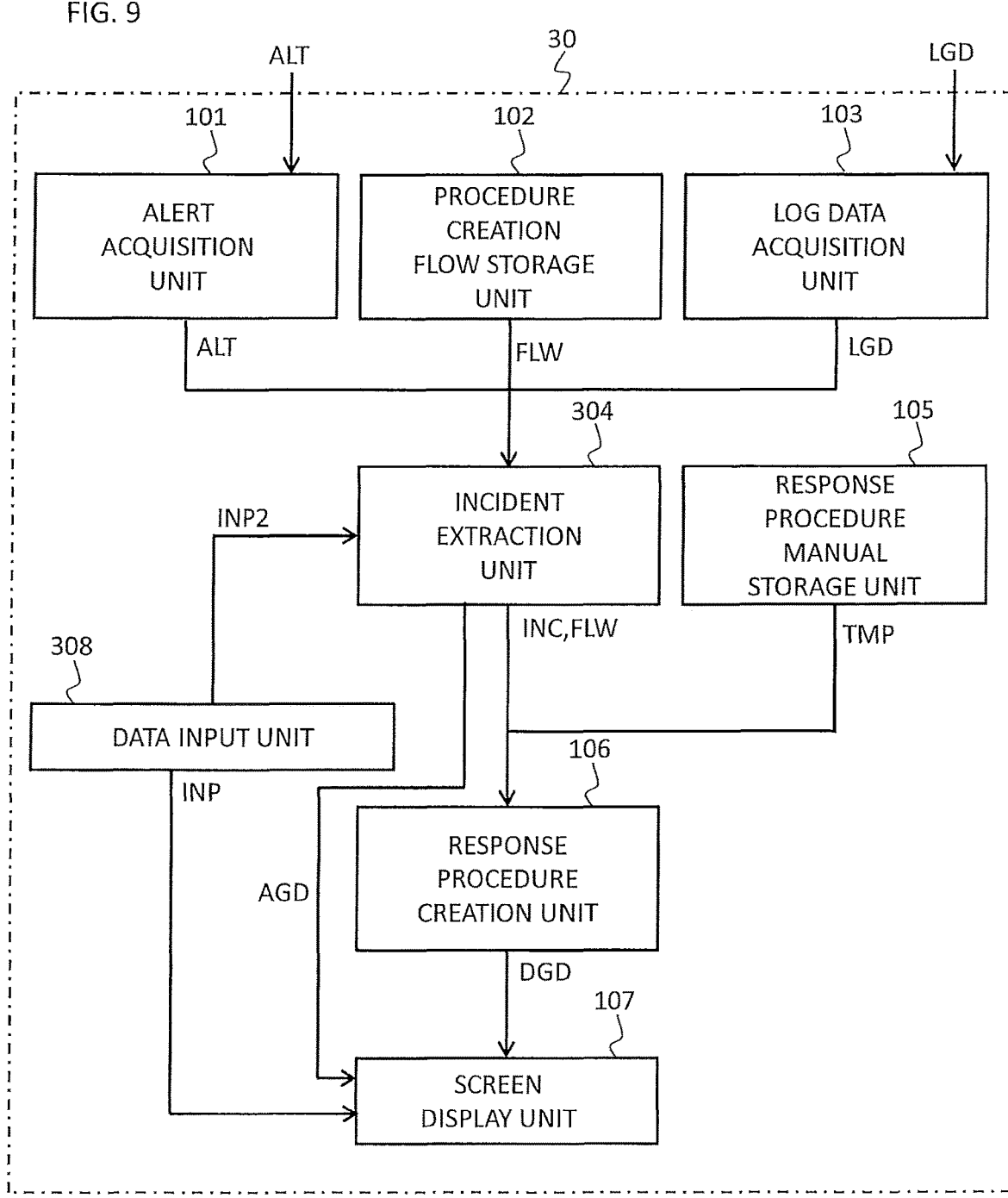
FIG. 9 is a functional block diagram showing an incident response assisting device according to Embodiment 3 of the present invention.

Hereinafter, Embodiment 3 of the present invention will be described with reference to FIGS. 9 to 12. FIG. 9 is a functional block diagram showing an incident response assisting device according to Embodiment 3. In FIG. 9, portions that are the same as or correspond to those in FIG. 2 are designated by the same reference characters. The incident response assisting device 30 is obtained by replacing the input unit 108 in Embodiment 1 with a data input unit 308. In addition, an action instruction table indicating an instruction to be given to the user is incorporated into an incident extraction process, and an incident extraction unit 304 outputs an action instruction AGD to be given to the user, to the screen display unit 107. The data input unit 308 transmits an input INP to the screen display unit 107 as with the input unit 108 in Embodiment 1, also receives an input from the user during execution of the process in the procedure creation flow FLW, that is, during creation of an incident response procedure from the incident extraction process, and transmits the input as input data INP2 to the incident extraction unit 304. The input data INP2 is, for example, data of a log added from the user, or data indicating the contents of incident response of the user. The action instruction AGD is, for example, an instruction to add lacking log data LGD.

Figure 10:
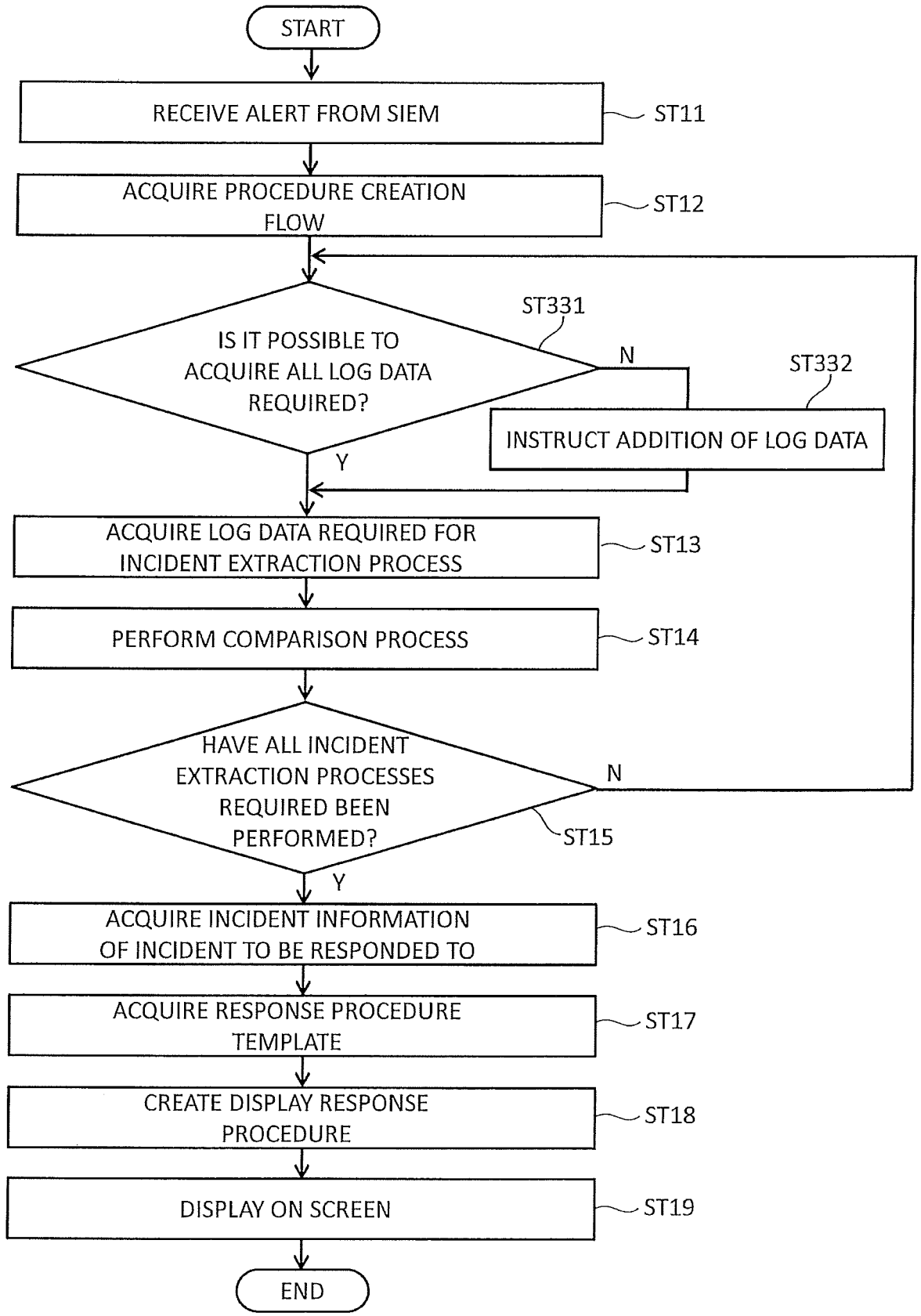
FIG. 10 is a flowchart showing operation of the incident response assisting device according to Embodiment 3 of the present invention.

FIG. 10 is a flowchart showing operation of the incident response assisting device according to Embodiment 3, FIG. 11 is a diagram showing the incident extraction process according to Embodiment 3, and FIG. 12 is a diagram showing an example of the action instruction table according to Embodiment 3. In FIG. 10, portions that are the same as or correspond to those in FIG. 5 are designated by the same reference characters. As shown in FIG. 11, the incident extraction process in Embodiment 3 includes four elements, a "process ID", a "comparison expression", a "reference expression", and a "jump destination". In the incident extraction process in Embodiment 3, regarding a jump destination in the case where there is no log, an instruction ID in the action instruction table is also set as the jump destination. In addition, as shown in FIG. 12, the action instruction table includes four elements, the "instruction ID", "display" that is a character string displayed as an instruction to be given to the user, "action" indicating action expected from the user, and a "jump destination" indicating a process ID or an action instruction ID of an instruction of process/action to be executed after action of the user.

Similar to Embodiment 1, the incident extraction unit 304 acquires the procedure creation flow FLW (step ST12), and then executes the SQL statement in the reference expression, thereby outputting an instruction to the log data acquisition unit 103 to confirm whether it is possible to acquire all required log data LGD (step ST331). When it is possible to acquire all required log data LGD, the incident extraction unit 304 proceeds to step ST13 and subsequently performs the same processes as in Embodiment 1.

When there is any log data LGD that cannot be acquired, the incident extraction unit 304 outputs an action instruction AGD for instructing addition of lacking log data LGD, to the screen display unit 107 and displays the contents of the action instruction AGD on the display device 94, thereby instructing the user to add the log data LGD (step ST332). When the user inputs the instructed log data LGD, the data input unit 308 transmits the inputted log data LGD as input data INP2 to the incident extraction unit 304. The incident extraction unit 304 confirms addition of the log data LGD and proceeds to step ST13. The subsequent processes are the same as in Embodiment 1. In Embodiment 3, the action instruction AGD is displayed on the screen display unit 107. However, another display unit different from the screen display unit 107 may be provided, and the action instruction AGD may be displayed on the display unit.

The action instruction shown in FIG. 12 is an example, and an instruction to change device settings or an instruction to input data may also be the action instruction AGD. In addition, the operation shown in FIG. 10 is an example, and even when the action instruction AGD is not outputted from the incident extraction unit 304, a subsequent process may be changed in accordance with an input from the user. Moreover, a process to be performed when the user has not taken action according to the action instruction (when action according to the action instruction has not been confirmed) may be added.

According to Embodiment 3, the same advantageous effects as those in Embodiment 1 can be obtained.

Since the data input unit that receives an input from the user during execution of the process in the procedure creation flow is provided, an incident response procedure corresponding to action of the user can be created, and thus it is possible to perform flexible incident response.

Since the action instruction table is incorporated into the incident extraction process and action required for extracting incident information is displayed as an action instruction to the user, when logs required for extracting an incident are lacking or when change of device settings is needed, it is possible to instruct the user to take required action. Therefore, it is possible to respond even when a problem such as lack of logs is found after start of the procedure creation flow, and thus extraction of an incident and creation of an incident response procedure can be more assuredly performed.

It is noted that, within the scope of the present invention, the above embodiments may be freely combined with each other, or each of the above embodiments may be modified or simplified as appropriate.

DESCRIPTION OF THE REFERENCE CHARACTERS

10, 30 incident response assisting device
91 IDS
93 SIEM
101 alert acquisition unit
103 log data acquisition unit
104, 304 incident extraction unit
105 response procedure manual storage unit
106 response procedure creation unit
107 screen display unit
ALT alert
AGD action instruction
LGD log data
INC incident information
INP2 input data
TMP response procedure template
DGD display response procedure

What is claimed is:

1. A system comprising:
an intrusion detection system configured to:
monitor packets sent or received by a monitored object, connected via a network, to one or more computing devices; and
collect log data for the monitored object; and
an incident response assisting device for assisting a user who performs response work when a security incident has occurred, the incident response assisting device comprising:
a processor for executing a program; and
a memory or a hard disk for storing the program,
wherein
the following operation is performed by the program executed by the processor,
acquiring incident detection information indicating that an incident has occurred in the monitored object, wherein the incident detection information is associated with a candidate illegal packet of the monitored packets, and
acquiring the log data of the monitored object, wherein the log data comprises login success and failure information over a predetermined period of time,
performing an incident extraction process on the incident detection information and the log data to extract incident information that identifies the incident that has occurred in the monitored object,
creating an incident response procedure corresponding to the incident that has occurred in the monitored object, on the basis of the incident information and a response procedure template created in advance, and
displaying the incident response procedure, and
the incident extraction process is composed of a series of comparison processes in which a content of a comparison process to be subsequently performed is changed in accordance with a result of a previously performed comparison process, wherein the incident extract process obtains a plurality of jump destinations associated with a series of processes to be performed, wherein each jump destination of the plurality of jump destinations includes a process identifier of a process of the series of processes to perform next after a current process of the series of processes is performed, and wherein the series of processes are repeated until no jump destination is left.

2. The system according to claim 1, wherein the incident response assisting device is configured to receive an input from the user between the incident extraction process and creation of the incident response procedure, and a process is changed in accordance with the input.

3. The system according to claim 2, wherein the incident response assisting device is configured to generate an action instruction for instructing the user to take action required for extracting the incident information is displayed.

4. The system according to claim 1, wherein the incident response assisting device is configured to select a range of the incident response procedure to be displayed in accordance with a progress status of response to the incident that has occurred in the monitored object, and the incident response procedure and the progress status are displayed in combination.

5. The system according to claim 1, wherein the incident response assisting device is configured to cause display of, when the incident information cannot be extracted, absence of any incident to be responded to.

6. The system according to claim 2, wherein the incident response assisting device is configured to select a range of the incident response procedure to be displayed in accordance with a progress status of response to the incident that has occurred in the monitored object, and the incident response procedure and the progress status are displayed in combination.

7. The system according to claim 3, wherein the incident response assisting device is configured to select a range of the incident response procedure to be displayed in accordance with a progress status of response to the incident that has occurred in the monitored object, and the incident response procedure and the progress status are displayed in combination.

8. The system according to claim 2, wherein the incident response assisting device is configured to cause display of, when the incident information cannot be extracted, absence of any incident to be responded to.

9. The system according to claim 3, wherein the incident response assisting device is configured to cause display of, when the incident information cannot be extracted, absence of any incident to be responded to.

10. The system according to claim 4, wherein the incident response assisting device is configured to cause display of, when the incident information cannot be extracted, absence of any incident to be responded to.

* * * * *